3,157,527
PROCESS FOR THE PRODUCTION OF GRAFT COPOLYMERS

André Fournet, Gilbert Christen, and René Jean Marcel Chambard, Lyon, France, assignors to Societe des Usines Chimiques Rhone-Poulenc, Paris, France, a French body corporate
No Drawing. Filed May 4, 1960, Ser. No. 26,680
Claims priority, application France May 26, 1959
6 Claims. (Cl. 117—47)

This invention relates to the production of graft copolymers and is more particularly concerned with a new process for grafting polymerisable monomers on articles consisting of polyvinyl alchol.

Polyvinyl alcohol articles, such as filaments, films and moulded or extruded articles have excellent mechanical properties, such as tensile strength, but they have the major disadvantage of being very sensitive to water, especially to hot water.

It has already been proposed to lessen or obviate this sensitivity to water by grafting polymerisable monomers on to the polyvinyl alcohol. This grafting has been effected either before or after the shaping of the polyvinyl alcohol.

In the first case, the grafting of the monomer on to polyvinyl alcohol has been effected in aqueous solution. There is thus obtained a grafted polyvinyl alcohol which has become water-insoluble, but which requires for its shaping the use of organic solvents, for example dimethylformamide when the grafted monomer is acrylonitrile.

In the second case, the process consists in immersing polyvinyl alcohol articles in the monomer to be grafted and exposing them to a high-energy ionising radiation, a process which requires complex and costly apparatus.

It has now been found, and this forms the subject of the present invention, that it is possible to graft polymerisable monomers on shaped polyvinyl alcohol articles without modifying their shape by treating the said articles with an aqueous solution of a radical initiator and thereafter bringing them into contact with the polymerisable monomer.

This treatment may be applied to all kinds of articles, for example filaments, films, tapes, belts, extruded articles, moulded articles, and the like. When applied to textile articles such as fabrics, the treatment brings about a fusion or welding together of the threads, which is valuable for certain purposes, for example in the production of panels for decorative use.

By varying the operating conditions, it is possible to obtain a surface graft or a depth graft on the articles, which imparts thereto either an entirely superficial insolubilisation or a deep-seated or total insolubilisation. In solubilisation by grafting has the advantage, often desirable, of not destroying the permeability to water vapour.

Polyvinyl alcohol is obtained by hydrolysing polyvinyl acetate. It is unnecessary for all the acetyl groups to be removed and polyvinyl alcohols may be employed which still contain up to about 30% of acetyl groups. Where films are employed they may be commercial films containing 15% of glycerin.

As polymerisable monomers, there may be employed polar monomers, such as acrylonitrile, methyl methacrylate, vinyl chloride and vinyl acetate, or any other monomer which polymerises with the aid of radical catalysts.

As water-soluble radical catalysts, there may be employed the persalts, for example potassium persulphate, or a redox system such for example as potassium persulphate and oxalic acid.

The treatment of the articles with the aqueous solution of the catalyst must be carried out under such conditions in regard to duration that the articles are not degraded by the water of the solution. The period of contact, which may vary from several seconds to several minutes, depends upon the thickness of the objects and upon the desired degree of grafting.

The persulphate solution or redox catalyst may be employed in concentrations generally ranging from 1% to 10%. The higher concentrations in this range favour high rates of grafting. The operation may be carried out at room temperature. In order to reduce the solubility of the polyvinyl alcohol during the pre-treatment with the catalyst solution, it may be desirable to dilute the water with a liquid, such as glycol, which is a non-solvent for polyvinyl alcohol, but which is a solvent for the persulphate catalyst.

After immersion in the catalyst solution and draining, if desired, the articles are brought into contact with the polymerisable monomer either in the liquid phase or in the vapor phase. By grafting in the liquid phase it is possible to fix high percentages of monomer on the polyvinyl alcohol.

When the operation is carried out in the vapor phase, it is sometimes advantageous in the case of some monomers to dilute their vapor with water vapor, so as to swell the polyvinyl alcohol and thus improving the penetration of the monomer.

The grafting temperature must be sufficient to produce decomposition of the catalyst into free active radicals. When the operation is carried out in the liquid phase, a temperature of from 40° to 50° C. is generally suitable. Lower temperatures may be used with redox systems. When the operation is carried out in the vapor phase, it may be carried out at the boiling temperature of the monomer or, for very volatile monomers, under pressure.

The duration of the grafting depends upon the degree of grafting which it is desired to obtain.

The grafting is accompanied by an increase in volume, which is substantially negligible with low degrees of grafting. When the grafting is very considerable, the increase of volume is greater, but it is found that it takes place homothetically and does not in any way change the shape of the article or the proportions of its original dimensions. Any loading agents and dyestuffs present in the articles treated remain uniformly distributed throughout the volume acquired by the article as a result of the grafting.

The following examples illustrate the invention. The film employed in Examples I to VIII is obtained by standard methods from polyvinyl alcohol containing about 15% of acetyl group and is plasticised with 15% of glycerin. It has a thickness of 0.25 mm.

Example I

The film is immersed for 2 minutes in a 5% aqueous potassium persulphate solution. After this treatment, it is withdrawn, drained and exposed for 30 minutes to methyl methacrylate vapours at the boiling point of the monomer (100° C.). After drying, it is found that the weight has increased by 126%. When immersed for 1 hour in water at room temperature, the treated film increases in weight by only 2.5%, whereas under the same conditions the untreated polyvinyl alcohol film undergoes a weight increase of 325%.

Example II

The film is immersed for 2 minutes in a 5% aqueous potassium persulphate solution. After draining, the film is placed in an autoclave, in which it is exposed to vinyl chloride vapours at 45° C. for 18 hours. After this treatment, it is found that the weight has increased by 289%. When immersed in water at normal temperature, the film increases in weight by only 1.2%.

Example III

The film is immersed for 5 minutes in a 5% aqueous potassium persulphate solution. It is thereafter exposed for 20 hours to vinyl chloride vapours at 45° C. The weight increase is 722%. The treated film undergoes no increase in weight when left in water.

Example IV

The film is immersed for 5 minutes in a 5% aqueous potassium persulphate solution and then introduced into liquid vinyl chloride in an autoclave for 18 hours at 45° C. The weight increase is 1550%. The treated film does not increase in weight when left in water. The film has increased in volume homothetically while retaining the same dimensional proportions.

Example V

The film is immersed for 1 minute in a 5% aqueous potassium persulphate solution and then exposed for half an hour to acrylonitrile vapours at 77° C. The weight increase is 12%. When immersed in water for 1 hour at room temperature, the film undergoes a weight increase of 47%. The permeability to water vapour, determined in the manner described below, is reduced to about one half of that of the ungrafted film.

To measure the degree of permeability, a receptacle containing 50 g. of water is employed, the lid of which consists of a film of the product to be tested (grafted or ungrafted polyvinyl alcohol). The receptacle thus closed is weighed and then placed for 20 hours in an enclosure maintained at a temperature of 50° C. After this treatment, the receptacle is again weighed and the difference between the weight of the receptacle in its final state and its weight in its initial state is determined. The loss of weight recorded corresponds with the steam which has diffused through the film under the conditions of the test.

If the film thus grafted is subjected to the action of boiling water, it separates into two, the internal polyvinyl alcohol dissolving, which indicates that the grafting has been effected only on the surface.

Example VI

The polyvinyl alcohol film is immersed for 1 hour in a 1% potassium persulphate solution in a mixture of 50 volumes of water and 50 volumes of glycol, and thereafter exposed for half an hour to acrylonitrile vapours at 77° C.

Under these conditions, the weight increase is 30%. When immersed in water for 1 hour at normal temperature, the film is doubled in weight. The permeability to water vapour at 50° C. is 85% of that of the untreated film. When immersed in boiling water, the film does not split into two. The grafting has thus been effected throughout, the presence of the glycol enabling the catalyst to become diffused within the film, while preserving sufficiently good mechanical properties for manipulation.

Example VII

The polyvinyl alcohol film is immersed for 1 hour in a mixture of 50 volumes of water and 50 volumes of glycol containing 1% of potassium persulphate, and then exposed for 2 hours to the vapours of a boiling mixture of 40 parts of water (by weight) and 60 parts of acrylonitrile. Under these conditions, the weight increase of the film is 150%.

Example VIII

The polyvinyl alcohol film is immersed for 2 minutes in a 5% aqueous solution of potassium persulphate and thereafter exposed for 1¼ hours to the vapours of a boiling mixture formed of 85 parts of vinyl acetate (by weight) and 15 parts of water. It is found that the weight of the film increases by 175%.

When immersed in water at normal temperature, the film undergoes a weight increase of 70%. Even prolonged immersion for 6 hours in boiling water does not detrimentally affect the film.

The permeability of the film to water vapour at 50° C. is half that of the original film.

The tensile strength is 2.5 kg./mm.² against 3.7 for the original film, and the elongation 200% against 340% for the original film.

Example IX

A mixture of 70 parts by weight of polyvinyl alcohol containing about 15% of acetyl groups, 30 parts of glycerin and 18 parts of water is extruded to form a band about 10 cm. wide and 3 mm. thick. From the band is cut a small rectangular piece, 4 cm. by 5 cm., which is immersed for 10 minutes in a 2.5% aqueous solution of potassium persulphate. It is then allowed to drain and exposed for 1 hour to the vapours of a boiling mixture of 95 parts by weight of acrylonitrile and 5 parts of water. As a result it increases in weight by 10%. When subsequently immersed in water at room temperature for 1 hour, it undergoes an increase in weight of only 1.9%, compared with a 50% increase for an ungrafted sample of the same initial weight.

Example X

A further rectangular piece of the same dimensions, cut from the band of Example IX, was subjected to grafting under identical conditions using the same monomer, but using, as catalyst solution, an aqueous solution containing 2.5% of potassium persulphate and 1% of oxalic acid. The treatment resulted in 11% increase in weight and the grafted film took up 2.4% of its weight of water on immersion for 1 hour at room temperature.

Example XI

A hollow tube of about 25 mm. external diameter and 2.3 mm. thick was extruded from the same polyvinyl alcohol mixture as that used in Example IX. A length of about 20 cm. was cut off and both ends stopped up with the object of grafting on the outside only. It is immersed for 10 minutes in an aqueous solution of 2.5% of potassium persulphate and 1% of oxalic acid, allowed to drain and then exposed for 1 hour to the vapours of a boiling mixture of 95 parts by weight of acrylonitrile and 5 parts of water. The increase in weight is 13%. The increase in weight of the grafted tube on immersion in water at room temperature for 1 hour is only 2.5% against 55% for a sample of the ungrafted tube.

It is evident that the grafting can equally well be applied to both inside and outside surfaces of the tube or can, if desired, be confined to its inside surface.

Example XII

A hank of polyvinyl alcohol fibre is immersed for 30 seconds in a 2.5% aqueous solution of potassium persulphate and allowed to drain. It is then exposed for 30 minutes to the vapours of a boiling mixture of 95 parts by weight of acrylonitrile and 5 parts of water. As a result the fibre is increased in weight by 140%. When plunged in water at 95° C. for 1½ hours, it remains intact whereas a sample of the ungrafted fibre is dissolved under these conditions in one minute.

The polyvinyl alcohol fibre used in this example is made from a high viscosity polyvinyl alcohol (a 4% aqueous solution of the polymer at 20° C. has a viscosity of 30 cps.), has a saponification number of 0.5, is not formulated to make it water-insoluble but is rendered insoluble in cold water by thermal treatment; it is completely soluble in water at 80° C.

We claim:
1. Process for the production of articles of grafted polyvinyl alcohol which comprises impregnating a pre-shaped article of polyvinyl alcohol, while maintaining its physical structure unchanged, with a solution of a free-radical generating initiator of polymerisation in an aqueous non-reactive solvent, which is chemically inert towards polyvinyl alcohol, contacting the resultant impregnated article with an ethylenically unsaturated polymerisable monomer in fluid phase and holding it in contact there- with at a temperature at which the polymerisation initiator is decomposed, the free radicals produced by this thermal decomposition being the sole initiators of the grafting of said monomer to the polyvinyl alcohol, and the whole process being carried out in the substantial absence of artificially induced high energy irradiation.

2. Process according to claim 1 wherein the said contact is maintained until the article is grafted with the monomer in depth.

3. Process according to claim 1 wherein the polymerisation initiator is a persulphate.

4. Process according to claim 1 wherein the polymerisation initiator is a mixture of an alkali metal persulphate and oxalic acid.

5. Process according to claim 1 wherein the article is contacted with the monomer with the monomer in gaseous phase.

6. Process according to claim 1 wherein the monomer is selected from the class consisting of acrylonitrile, vinyl chloride, vinyl acetate and methyl methacrylate.

References Cited in the file of this patent

UNITED STATES PATENTS

| | | |
|---|---|---|
| 2,816,087 | Coover | Dec. 10, 1957 |
| 2,837,496 | Vandenberg | June 3, 1958 |
| 2,907,675 | Gaylord | Oct. 6, 1959 |
| 2,956,899 | Cline | Oct. 18, 1960 |
| 2,999,772 | Burk et al. | Sept. 12, 1961 |

FOREIGN PATENTS

| | | |
|---|---|---|
| 580,203 | Italy | July 30, 1958 |